United States Patent [19]
Yano et al.

[11] Patent Number: 5,711,246
[45] Date of Patent: Jan. 27, 1998

[54] SYSTEM FOR IDENTIFYING LIVESTOCK AND OTHER INDIVIDUALS

[75] Inventors: Tomoji Yano; Hisashi Asoh; Kazundo Tanaka, all of Tokyo, Japan

[73] Assignee: Electronics on Animal Industries Research Association, Tokyo, Japan

[21] Appl. No.: 596,491

[22] Filed: Feb. 5, 1996

[30] Foreign Application Priority Data

Jun. 13, 1995 [JP] Japan ..................................... 7-169315

[51] Int. Cl.$^6$ ................................................. A01K 29/00
[52] U.S. Cl. ....................... 119/51.02; 119/719; 119/720; 119/908
[58] Field of Search .............................. 119/51.02, 712, 119/719, 720, 840, 908

[56] References Cited

U.S. PATENT DOCUMENTS

| | | | |
|---|---|---|---|
| 4,612,877 | 9/1986 | Hayes et al. | 119/156 |
| 4,617,876 | 10/1986 | Hayes | 119/155 |
| 4,718,374 | 1/1988 | Hayes | 119/655 |
| 5,138,008 | 8/1992 | Carrano | 119/155 |
| 5,438,960 | 8/1995 | Roosenboom | 119/713 |

*Primary Examiner*—John S. Hilten
*Attorney, Agent, or Firm*—David J. Archer

[57] ABSTRACT

A system for identifying livestock and other individuals comprising an identification plate for identifying the animal and a gate-shaped antenna, which is characterized in that the identification plate is a marker plate, which in turn is made of a soft material and comprises a flexible printed board formed with an antenna coil, a tuning condenser and an electronic circuit; said gate-shaped antenna comprises plural unit antennas which are wound with a coil each and which are crossed at an angle so that electromagnetic fields can be generated over a wide range of area without interfering with each other at the time of radio wave transmission/reception for retrieving data on said identification plate.

3 Claims, 4 Drawing Sheets

SYSTEM FOR IDENTIFYING LIVESTOCK AND OTHER INDIVIDUALS

BACKGROUND OF THE INVENTION

The present invention relates to a system for retrieving individual identification data on livestock such as cattle, horses, pigs or sheep.

In the conventional art, earmarks are known as an effective means for obtaining individual information of livestock. A conventional earmark comprises a marker plate and a means for attaching the marker plate to a subject. The marker plate indicates an identification number of an individual to enable a person in charge to identify the individual.

In recent years, however, demand has emerged for a new system which is capable of mechanically reading out not only the ID number but also various other individual information such as those on growth data and health management.

There is known such a system which uses an electromagnetically induced transponder. The system comprises a transponder or an identification (ID) member made of a small-size cylinder containing a power-source-free circuit which is buried in the corporal body, especially behind the ear, and an interrogator for reading out ID data from said ID member. The interrogator is brought close to an animal so that the transponder attached to the animal will be within the magnetic field of the interrogator, whereby a current is induced in the transponder coil in the direction of cancelling changes in the magnetic field, enabling the transponder to store electricity. When a signal current for responding to the interrogator is generated in the transponder coil using said stored electricity, a magnetic field is created.

An induced current is then generated in the antenna on the interrogator side, which means the interrogator has received the data. ID information of the livestock recorded on the transponder thus becomes retrievable.

However, conventional electromagnetically-induced power-source-free transponders are defective in that as the system must be made small enough to be buried in the animal body, their sensitivity is essentially low.

In order to generate an induced current, it is important to adequately orient the direction of the magnetic field generated in the interrogator antenna as well as the direction of the transponder coil located within the range of the magnetic field. If the transponder coil is not oriented in the right direction, induced current cannot be generated. The following stands true of the relative direction.

(a) Magnetic flux running normal to the coil is the best.

(b) Magnetic flux running parallel to the coil is the worst.

(c) Magnetic flux intersecting the coil but not at the normal angle is satisfactory.

Because of its cylindrical shape, the power-source-free electromagnetically induced transponder is highly directional, but the animals usually move in a highly random manner irrespective of the directionality of the system. Thus, if an animal in the state (b) passes beneath the antenna, no data can be read out.

OBJECTS AND SUMMARY OF THE INVENTION

In view of the foregoing, the present invention has been contrived to provide a system for retrieving identification data on individual livestock which is essentially sensitive and free of failure in data reading.

In sum, the present invention system for reading out ID information of livestock comprises and is characterized by an identification plate and a gate-shaped antenna. The animal ID plate is a marker plate made of a soft material, to which is attached an ID member comprising a flexible printed board having an antenna coil, a tuning condenser and an electronic circuit thereon. The gate-shaped antenna comprises plural unit antennas, each with a conductor wound in a loop. The plural unit antennas are disposed to intersect with each other at an angle which would generate a wide band electromagnetic field without interfering with each other when the electromagnetic waves are transmitted/received, to thereby enable reading of information on the animal recorded on the ID plate.

DETAILED DESCRIPTION OF THE INVENTION

The term "animal" used in this specification should be understood in a broad sense to include not only livestock but all living things including the human beings. The present invention ID plate for animals can be attached to clothing as well as to the corporal body by using an adequate fixing means.

It is noted that said ID member is formed using the substantially maximum area of the marker plate; more specifically, the marker plate is thin and flat, has an area equal to that of the flexible printed board of the ID member. A coil is provided on the entire surface of the flexible printed board. Plural layers of coil may be formed on the flexible printed board of the ID member.

It is preferable that the angle of intersection between each unit of the gate-shaped antenna can be arbitrarily changed by using such means as hinges.

With the the present invention system having the above construction, data on individual animals is not only written on the marker plate but is also stored in the ID member which comprises the flexible printed board, an antenna coil, a tuning condenser and an electronic circuit. The ID plate is attached to the body of an animal using a fixing means.

To retrieve data on individual livestock, animals are guided to pass through the gate-shaped antenna. As the unit antennas are crossed, magnetic fluxes from each of the unit antenna become combined when current is applied, and the loop-shaped magnetic fluxes inside the gate antenna meander as shown in FIG. 7. This meandering of the magnetic fluxes allows the system to have a wide range of directional patterns. As a result, an animal passing through this magnetic field remains subject to the influence of the magnetic field regardless of its direction of movement and generates induced current to thereby produce signal current. The signal current in turn is trapped by the antenna and ID data is retrieved.

The marker plate is made of a soft flexible material and is therefore easily bent or curved when the animal inadvertently bumps into another animal or clashes against an obstacle such as a tree, effectively deflecting the force and thus preventing damages or slipping off of the marker plate. Damages to the animal wearing the marker plate can also be prevented.

As such, it is possible to enlarge the surface area of the marker plate or the coil area on the flexible printed board. This means that the marker plate is exposed to a greater amount of magnetic flux generated at the gate-shaped antenna. The marker plate will therefore have sufficient sensitivity and be capable of data transmission over a greater distance.

As mentioned in the foregoing, the present invention marker plate is provided with an identification member which comprises a flexible printed board, an antenna coil, a tuning condenser and an electronic circuit. Said gate-shaped antenna system includes plural unit antennas, each wound with a looped conductor. These plural unit antennas are intersected at an angle which would allow generation of a wide range of electromagnetic fields that would not interfere with each other during transmission/reception of electromagnetic waves. This assures improved sensitivity of the system as well as a wider range of directional patterns of the gate-shaped antenna, assuring in turn precise identification of individual animals over a wider range of area. By allowing the unit antennas of the gate-shaped antenna to be crossed at any arbitrary angle, it becomes possible to set the intensity of the magnetic field at a level most suitable for the particular site of use. Moreover, as the surface area of the flexible printed board of the ID member is made substantially equal to the thin and flat marker plate and the board is wound with a coil on its entire surface, the sensitivity of the system is greatly improved. With the combined use of the marker plate of such construction with the gate-shaped antenna, data transmission/reception is possible at a high average level of sensitivity without special consideration to the directional patterns of the system or to the directionality. By letting animals pass through the gate-shaped antenna just once, ID information on each animal can be retrieved without failure, and displayed on a monitor screen for easy reading.

DESCRIPTION OF THE PREFERRED EMBODIMENTS

Figure 1:
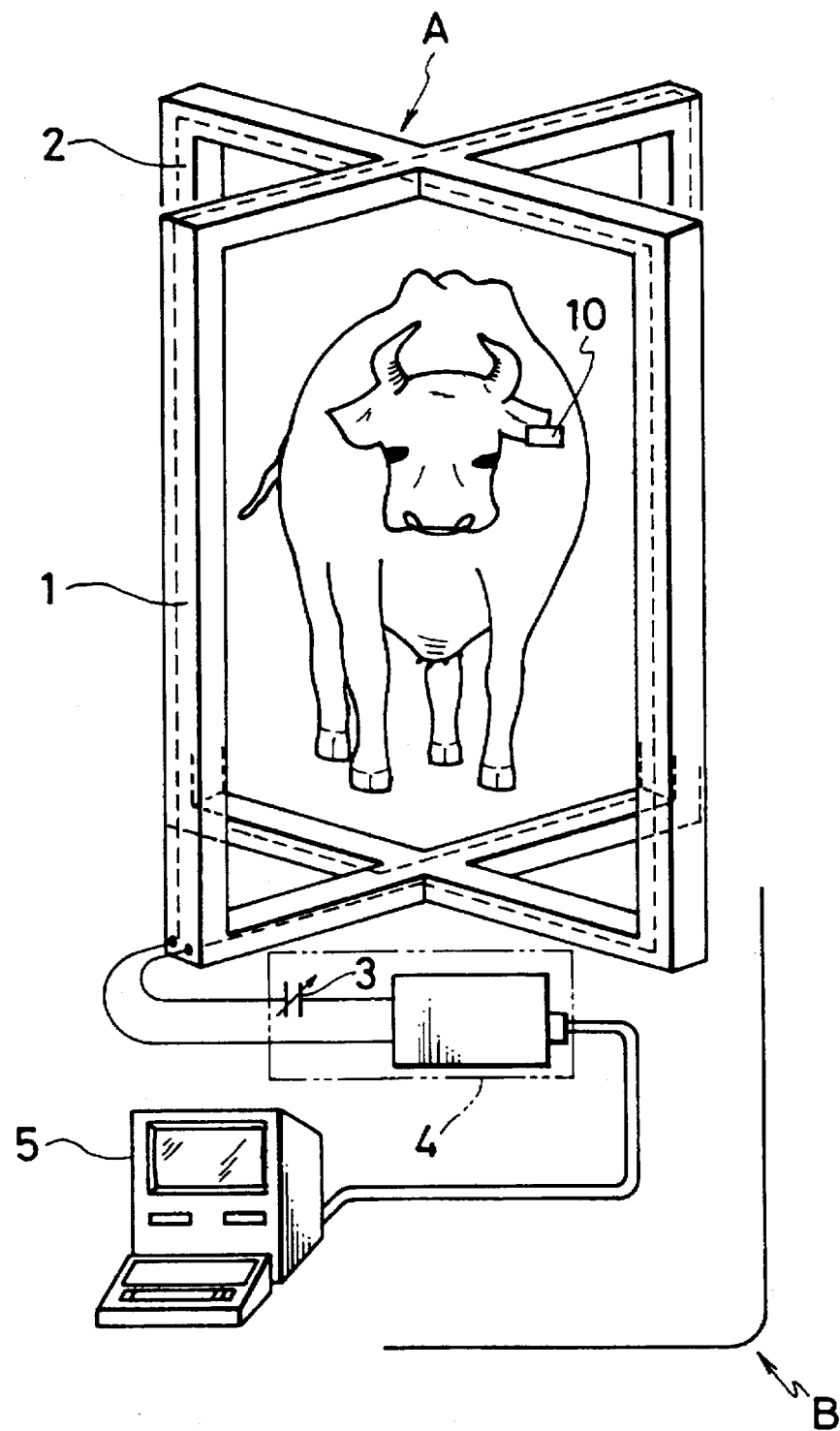
FIG. 1 is a schematic drawing to show the present invention system for identifying individual animals.

FIG. 1 is a schematic drawing to show the system B for identifying individual animals. In the figure, the legend A denotes a gate-shaped antenna according to the present invention, the numeral 3 a tuning condenser, 4 a transceiver, 5 a data processing unit, 20 an ID plate attached to an animal.

Figure 2:
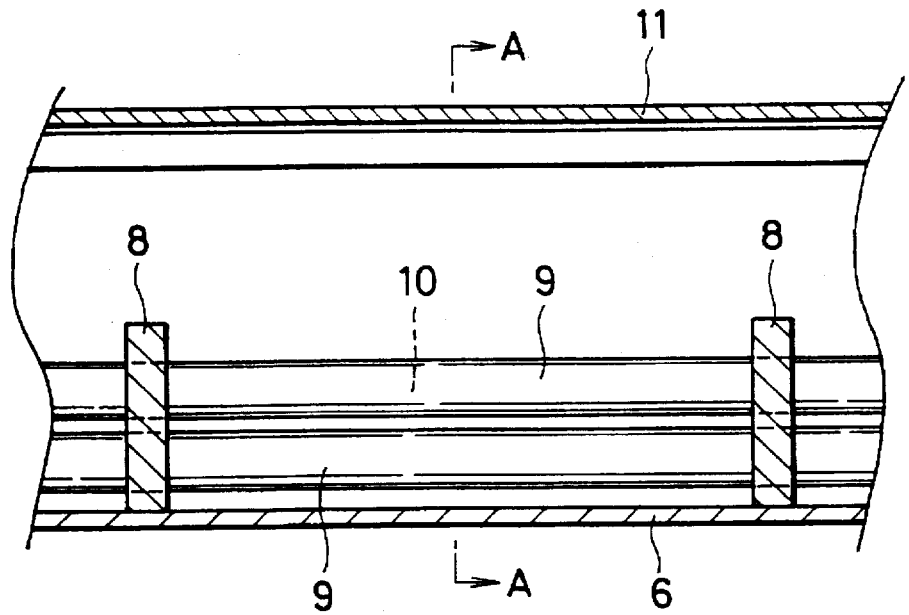
FIG. 2 is a partially enlarged sectional view to show the inside structure of an unit antenna.
Figure 3:
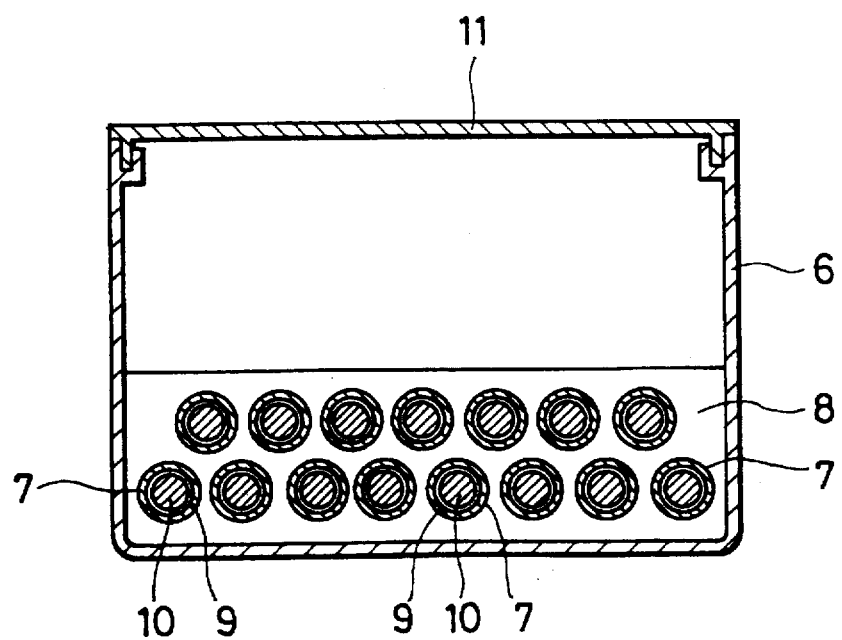
FIG. 3 is a vertical sectional view taken along the line A—A in FIG. 2.

Referring now to FIG. 1, the gate-shaped antenna A comprises unit antennas 1 and 2, each of which is wound for a plural number of times with a conductor having excellent conductivity and little loss, the unit antennas being crossed with the other at a predetermined angle, e.g. 30° to 45°. In order to achieve an orderly winding of the conductor on each of the unit antennas 1 and 2, support plates 8 bored with through-holes 7 in close arrangement are erected at a predetermined interval inside a synthetic resin case 6 as shown in FIGS. 1 and 2. Pipes 9 are fixed in place by passing them through the through-holes 7 of the support plates 8. The conductor 10 is inserted through the pipe 9, and the opening of the case 6 is sealed by a cover plate 11.

As shown in FIG. 1, unit antennas 1 and 2 constituting the gate antenna A may be fixedly crossed at a predetermined angle; alternatively, they may be connected by hinges so that the angle of their crossing may be varied arbitrarily. Two unit antenna members are shown in FIG. 1 but the number of unit antennas may be increased to three or more than four so long as they do not interfere with the animals passing therethrough.

Figure 4:
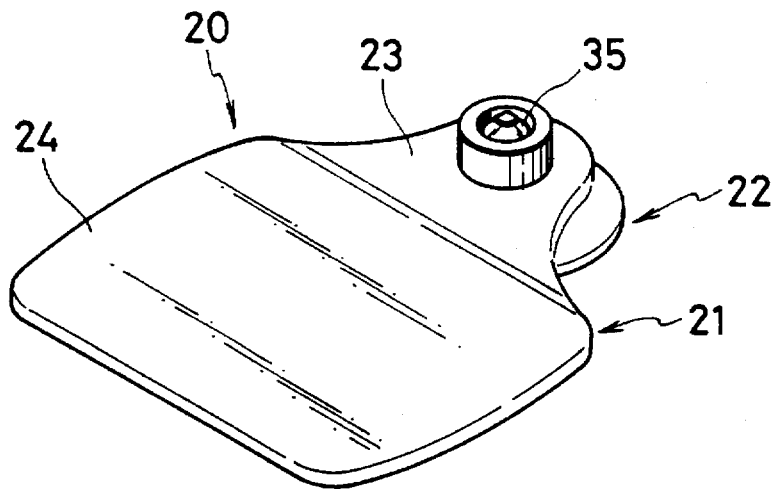
FIG. 4 is a perspective view to show the ID plate.
Figure 5:
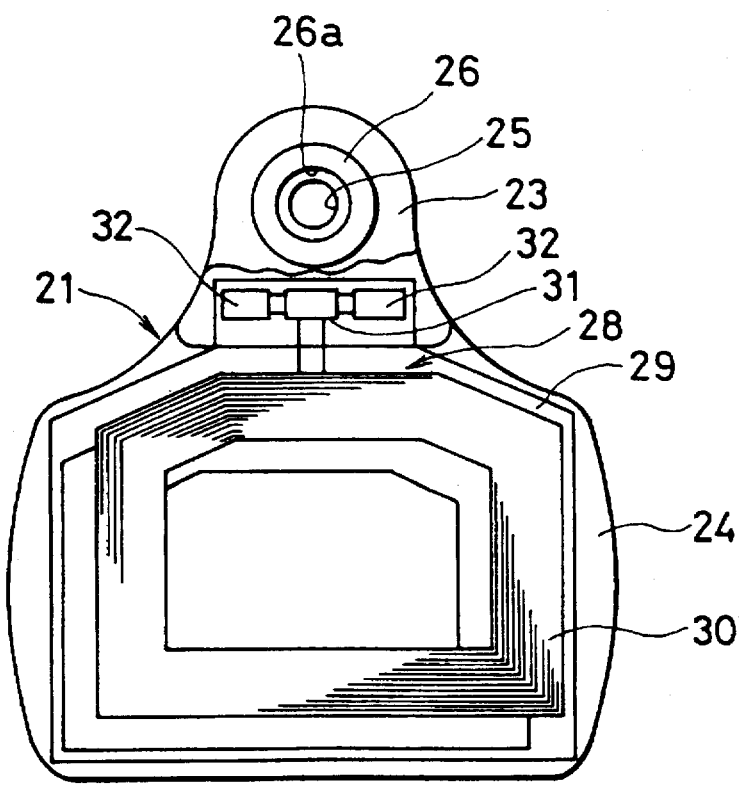
FIG. 5 is a front view of the marker plate constituting the ID plate with its surface member removed.
Figure 6:
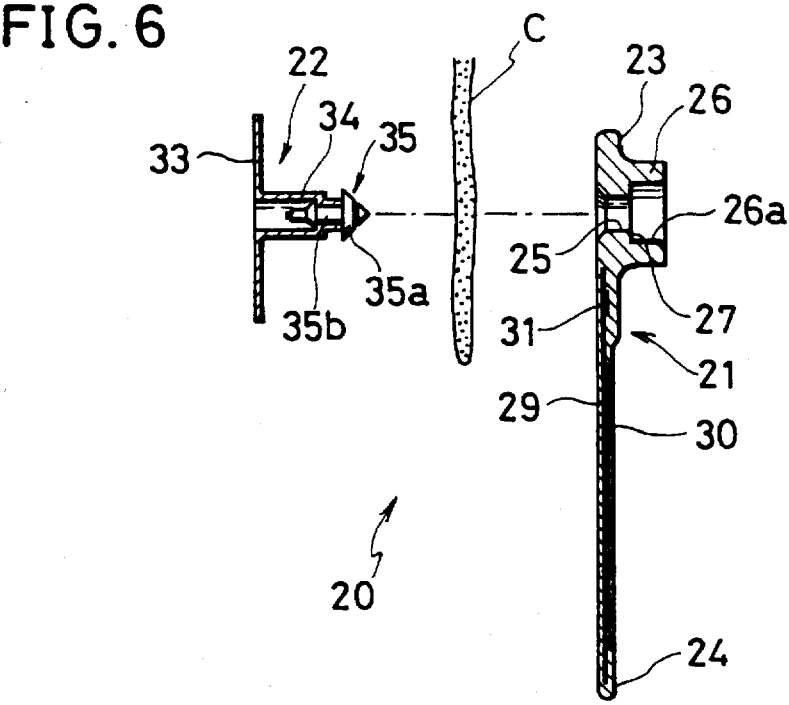
FIG. 6 is a sectional view to show the ID plate and the fixing means.
Figure 7:
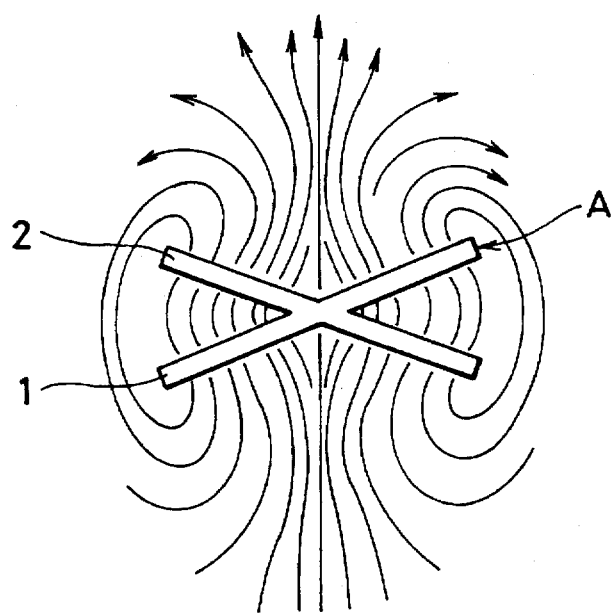
FIG. 7 is a view to show the magnetic fluxes generated at the antenna.
Figure 7:

As shown in FIGS. 4 through 6, the reference numeral 20 denotes an ID plate for identifying an individual animal, which comprises a marker plate 21 and a fixing means 22 and which is attached to the ear C of an animal such as that shown in FIG. 6. The marker plate 21 is made of a soft material such as soft polyvinyl chloride resin and comprises an attachment member 23 to be attached to the ear C and a plate member 24 which is formed integrally with the attachment member 23.

As shown in FIGS. 5 and 6 and described below, the attachment member 23 has a bore 25 to receive the fixing means 22. On one of the surfaces of the attachment member 23 is provided a cylindrical member 26 having a bore 26a which communicates with said bore 25. As the bore 26a is larger in diameter than the bore 25, there is formed a step portion 27 against which a spike formed on the fixing means 22 rests. The plate member 24 is made thinner in thickness than the attachment member 23, and the surface thereof on which the cylindrical member 26 is formed is used for marking by stamping or pasting ID data such as the ID number and the age of the animal.

An identification means 28 is disposed inside the attachment member 23 and the plate member 24. The identification means 28 is an EID (electronics identification) made of a flexible printed board 29 which is formed with a transmission/reception coil 30, a power-source-free IC circuit 31 and a condenser 32.

The flexible printed board 29 of the identification member 28 has an area substantially equal to that of the thin and flat plate member 24. The coil 30 is provided on the entire surface of the flexible board 29. In other words, the transmission/reception coil 30 formed over the substantially entire surface of the plate member 24 allows communication over a long distance at sufficiently high sensitivity.

If the frequencies used are low, it is necessary to increase inductance of the transmission/reception coil 30, and this can be achieved by electrically connecting plural layers of the flexible printed wiring board 29. As inductance of the printed board increases to the second power of the number of layers, inductance of a four-layer printed board would be 16 times higher than the one-layer printed board. Moreover, even when the printed boards are laminated in four layers, their thickness would be merely 0.8 mm and thus they will not lose their flexibility.

To manufacture a marker plate 21 of the above construction, two pieces of material (e.g. soft polyvinyl chloride) for the top and bottom surfaces of the marker plate 21 are prepared in advance. A flexible printed board 29 formed with EID is interposed and sealed in between these two pieces by heating.

The fixing means 22 is made of the same material as the marker plate 21. As shown in FIG. 6, it comprises a disk member 33, a cylindrical member 34 projecting from the center of the disk member 33, and a spike 35 formed at the tip end of the cylindrical member 34. The spike 35 is made of metal such as brass or hard resin and includes a conical head member 35a and a stem 35b extending from the head member 35a. The head member 35a and the stem 35b become fixed to the cylindrical member 34 as the stem 35b is inserted in the latter. The bottom portion of the head member 35a of the spike 35 is larger in diameter than the tip end of the cylindrical member 34, forming a step that engages with the step portion 27 of the attachment member 23 of the aforementioned marker plate 21.

The present invention identification plate 20 of the above construction may also be attached to livestock such as cattle and pigs in exactly the same manner as the prior art ID plate. First, the marker plate 21 and the fixing means 22 are tentatively placed at the front and the rear of the ear C of an animal with the bore 25 and the spike 35 opposing each other. The fixing means 22 is pressed toward the marker plate 21 by using a special kind of forceps. Here, the marker plate 21 is in contact with the ear C on the surface opposite to the one provided with the cylindrical member 27. As the fixing means 22 is pressed toward the marker plate 21, the spike 35 provided at its tip end pierces the ear C and enters the bore 25 of the marker plate 21. By pressing the fixing means 22 farther into the bore 25, it eventually enters the bore 26a of the cylindrical member 26 and the bottom face of the head 35a of the spike 35 rests against the step 27, whereby the marker plate 21 and the fixing means 22 are integrally connected and the identification plate 20 now stays fixed to the ear C.

What we claim:

1. A system for identifying livestock and other individuals, said system comprising:
   an identification plate for identifying the livestock and other individuals; and
   a gate-shaped antenna;
   said identification plate being a marker plate fabricated from a soft material;
   said identification plate including:
      a flexible printed board;
      an antenna coil;
      a tuning condenser;
      an electric circuit;
   said gate shaped antenna comprising:
      a first unit antenna;
      a first coil wound within said first unit antenna;
      a second unit antenna;
      a second coil wound within said second unit antenna;
      said first and second coils being disposed angularly relative to each other such that said coils cross each other so that electromagnetic fields can be generated over a wide range of area without interfering with each other during transmission/reception of a radio wave for retrieving data on said identification plate.

2. The system for identifying livestock and other individuals as claimed in claim 1 wherein
   said coils cross each other at an angle which is variable.

3. The system for identifying livestock and other individuals as claimed in claim 1 wherein the flexible printed board has an area substantially equal to that of the identification plate and is formed with an antenna coil over the entire surface thereof.

* * * * *